Aug. 17, 1954     V. L. VOCK ET AL     2,686,447
STUD EXTRACTOR STRUCTURE
Filed May 11, 1953
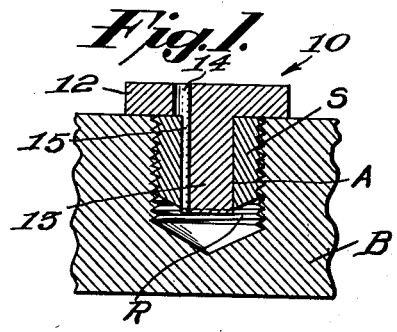
Fig. 1.
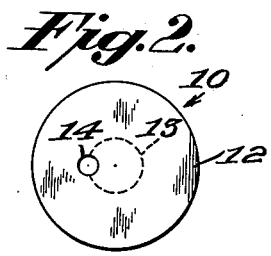
Fig. 2.
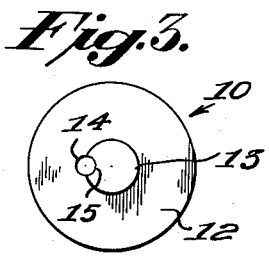
Fig. 3.
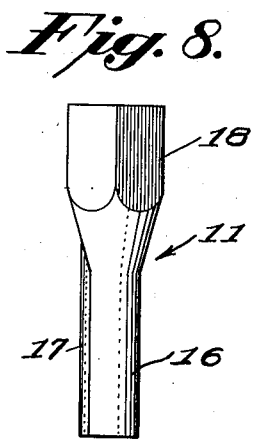
Fig. 8.
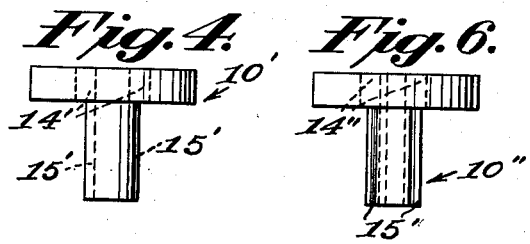
Fig. 4.    Fig. 6.
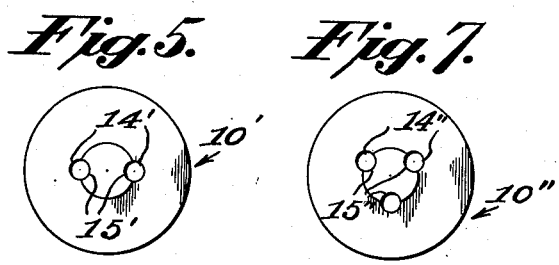
Fig. 11.    Fig. 13.
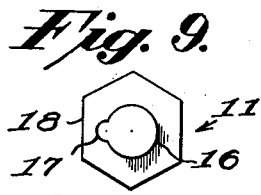
Fig. 9.
Fig. 5.
Fig. 7.
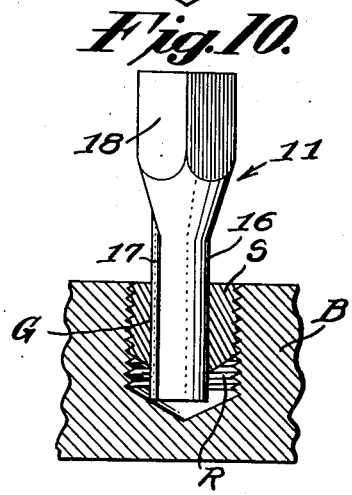
Fig. 10.
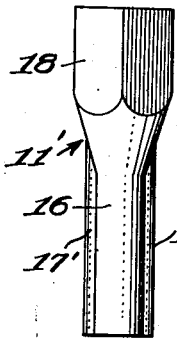
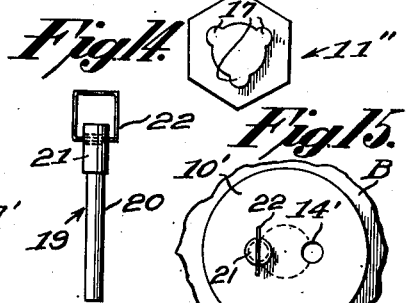
Fig. 14.    Fig. 15.
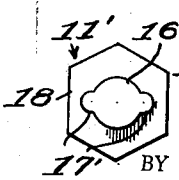
Fig. 12.
INVENTORS
Vernon L. Vock.
Charles R. Ebert.
BY George A. Tew
ATTORNEY Patented Aug. 17, 1954

2,686,447

UNITED STATES PATENT OFFICE 2,686,447

STUD EXTRACTOR STRUCTURE

Vernon L. Vock and Charles R. Ebert,
San Bernardino, Calif.

Application May 11, 1953, Serial No. 354,322

6 Claims. (Cl. 81—53)

This invention relates to a stud extractor structure.

The invention is more particularly directed to an improved structure for the ready extraction of the ends of stud bolts or the like which have been broken off flush with or below the surface of a cylinder block or the like.

The customary practice in removing broken off ends of stud bolts from a cylinder block or the like is as follows. First, the stud segment is drilled centrally thereof to provide a straight sided aperture of sufficient length and diameter to permit the insertion of an extraction tool, and then the tool is disposed within such aperture and operated for the extraction of the stud upon rotation thereof.

Heretofore, there have been several forms of extracting tools proposed or used in the removal of broken stud bolts and which included the following general types. First, the tapered type which is driven into the prepared aperture in the stud bolt and which engages the wall of the aperture by various numbers of designs of ridges or faces; second, the straight shank type with V-shaped ridges disposed around the periphery of the shank and which is driven into the aperture in the stud. In this type of extractor, the V-shaped ridges which extend parallel to the major axis of the shank of the tool, form grooves in the wall of the aperture by causing the metal of the stud to flow axially, as the extractor is driven into position in the stud; and, third, the chisel type having a non-tapered shank and chisel pointed lands or flutes which cut their own grooves as the tool is driven into position.

All of the above noted types of stud extractors have one or more of the following inherent disadvantages. Some types cause an outward pressure to be exerted against the wall of the aperture. This pressure is developed either in the process of driving the extractor into position or when torque is applied to the extractor in an attempt to remove or back out the broken or frozen stud, or this pressure may develop at both operations. In either or both cases, pressure thus developed is transmitted through the body of the stud to the stud threads and causes them to bend even more tightly in the mating threads in the block.

All tapered shank extractors have the inherent disadvantage of having a relatively short area of engagement between the gripping members of the extractor and the straight sided aperture in the stud.

A further difficulty with present chisel type extractors is that if the operator does not use extreme care and skill in inserting the extractor in the stud aperture, the tool will get out of line as it enters the aperture and will gouge or cut through the wall of the broken stud into the female threads in the block and thereby cause the very damage that the use of the tool is endeavoring to eliminate.

The above noted disadvantages of the types of extractors heretofore used have heretofore been appreciated as will be observed from the disclosure in the patent to T. W. Royer et al., No 2,600,924 wherein is disclosed a stud extractor, while being generally of the above noted third type is designed in an effort to avoid undue pressure on the cooperating stud and block threads.

In this latter form of extractor, however, substantial pressure on the co-operating threads is of necessity exerted in a direction axially of the aperture and accordingly danger of damaging the block threads still remains.

A primary object of the present invention is to provide novel structure for the removal of broken off stud bolts from a cylinder block or the like in total absence of any damaging effect on the female threads in the block.

A further object of the invention is to provide novel structure by the use of which broken off stud bolts may be easily removed regardless of their degree of tight hold in the block and in the absence of any damage to the block threads.

Other objects and advantages of the invention will become apparent in the course of the following detailed description, taken in connection with the accompanying drawing wherein—

Fig. 1 is a fragmental vertical sectional view of a cylinder block, showing a drilled broken off end of a stud bolt therein together with one form of guide unit embodied in the invention in operative position.

Fig. 2 is a top plan view of the guide unit shown in Fig. 1.

Fig. 3 is a bottom plan view of the guide unit shown in Fig. 1.

Fig. 4 is a side elevational view of a further embodiment of the guide unit.

Fig. 5 is a bottom plan view of the guide unit shown in Fig. 4.

Fig. 6 is a side elevational view of a still further embodiment of the guide unit.

Fig. 7 is a bottom plan view of the guide unit shown in Fig. 6.

Fig. 8 is a side elevational view of one embodiment of a wrench engageable extractor unit.

Fig. 9 is a bottom plan view of the extractor unit shown in Fig. 8.

Fig. 10 is a fragmental vertical sectional view of a cylinder block and apertured broken off stud bolt therein and showing the extractor unit of Figs. 8 and 9 in operative engagement with the stud bolt.

Fig. 11 is a side elevational view of a modified embodiment of the wrench engageable extractor unit.

Fig. 12 is a bottom plan view of the extractor unit shown in Fig. 11.

Fig. 13 is a bottom plan view of a still further embodiment of the extractor unit.

Fig. 14 is an elevational view of a guide unit positioning pin.

Fig. 15 is a top plan view showing a portion of the top wall of a cylinder block, the guide unit of Figs. 4 and 5 and the positioning pin in operative relation to the block and guide unit.

Referring now in detail to the drawing, B (Figs. 1 and 10) designates a cylinder block having a threaded stud bolt receiving recess R therein and in which the lower broken off end portion of a threaded stud bolt S is shown.

The extractor structure comprises a guide unit 10 and a cooperating extractor unit 11. The guide unit includes a circular head portion 12 and a cylindrical portion 13 projecting axially from one face of the head portion. The head portion 12 is provided with a relatively small diameter guide hole 14 whose axis is aligned with the wall of the cylindrical portion 13 and in which a generally semi-cylindrical groove 15 is provided, the wall of the groove being concentric with the inner half of the wall of hole 14.

The guide unit 10 is positioned as in Fig. 1 with the cylindrical portion 13 disposed within the pre-drilled aperture A in the stud bolt S and with the head portion 12 seated on the top face of the block B.

A suitable bit is then introduced into hole 14 and the stud S is drilled with a resulting generally semi-circular groove G (Fig. 10). The guide unit 10 is then removed and the extractor unit 11 is introduced into the aperture A as indicated in Fig. 10.

The extractor unit includes a cylindrical shank portion 16 whose diameter is equal to that of the cylindrical portion 13 and which is provided with an axially extending rib 17 which in transverse section conforms to the groove G and a wrench engageable portion 18.

With the extractor unit operatively positioned as in Fig. 10, a wrench is applied to the portion 18 and the extractor unit thereby rotated with a resulting withdrawal of the broken stud S.

In the use of the structure above described, a positive hold is obtained between the extractor unit and the stud bolt whereby the latter is rotated without damaging pressure on the female threads of the block recess R.

Furthermore, by use of the guide unit 10 the groove G in the stud bolt B is accurately positioned for effective operative engagement of the rib 17 therewith.

In the modified form of guide unit 10' of Figs. 4 and 5, a pair of diametrically opposed holes 14' and corresponding grooves 15' are provided and the corresponding modified form of extractor unit 11' is provided with a pair of diametrically opposed ribs 17'.

In the modified form of guide unit 10'' of Figs. 6 and 7, three holes 14'' and corresponding grooves 15'' are provided and the corresponding extractor unit 11'' is provided with three ribs 17''.

While the first form of guide and extractor unit is highly satisfactory the use of two or more ribs 17' or 17'' engageable within a corresponding number of grooves in the stud bolt provides a more effective hold for release of the stud bolt.

In the use of the guide units 10' and 10'' wherein more than one hole 14 is provided a locating pin 19 is provided and which includes an elongated shank portion 20 insertable within one hole 14' or 14'' after drilling the block B therethrough for holding the guide unit in position while drilling the block through the other holes 14' or 14''. The pin further includes an enlarged head 21 provided with a pin lifting bail 22.

While we have disclosed our invention in accordance with a single specific structural embodiment thereof, such is to be considered as illustrative only, and not restrictive, the scope of the invention being defined in the sub-joined claims.

What we claim and desire to secure by U. S. Letters Patent is:

1. Means for extracting a broken stud bolt from a cylinder block or the like and wherein said stud bolt is provided with a drilled cylindrical walled aperture axially thereof; comprising a drill guide unit including a disk-like head portion seatable on said block and a cylindrical portion of a diameter corresponding to that of said aperture projecting from one face of said head portion in concentric relation thereto and being receivable in the said aperture, said head portion being provided with a circular hole whose axis lies in the surface of said cylindrical portion and said cylindrical portion being provided with a groove which is substantially semi-circular in cross section and which is concentric with said hole, said hole and said groove being of equal diameter and being adapted to receive a bit for drilling a generally semi-circular groove in the cylindrical wall of said aperture, and a wrench engageable extractor unit having a cylindrical shank whose diameter is equal to the diameter of said cylindrical portion and which is receivable in said aperture and a generally semi-circular rib of a diameter equal to said hole extending lengthwise of said shank and being receivable within said second named groove for establishing a firm driving connection between the extractor unit and said broken stud bolt.

2. The structure according to claim 1, wherein said guide unit is provided with a second hole and groove in the head and cylindrical portions thereof corresponding in size and arrangement to said first hole and groove and being disposed diametrically opposite same.

3. The structure according to claim 2, wherein said extractor unit is provided with a second rib corresponding in size and form to said first rib and being disposed diametrically opposite same.

4. The structure according to claim 1, wherein said guide unit is provided with a pair of additional holes and grooves in the head and cylindrical portion thereof which correspond in size and arrangement to the first hole and groove and whose axes together with the axis of the first hole and groove are in 120° spaced relation.

5. The structure according to claim 4, wherein said extractor unit is provided with a pair of additional ribs corresponding in size and form to the first rib and whose axes together with the axis of said first rib are in 120° spaced relation.

6. The structure according to claim 2, together with a cylindrical guide pin receivable within one of said holes and the corresponding groove together with the drilled groove in said stud bolt for retaining the guide unit in proper angular position while drilling through the second hole.

References Cited in the file of this patent

UNITED STATES PATENTS

| Number | Name | Date |
|---|---|---|
| 410,780 | Cahn | Sept. 10, 1889 |
| 647,133 | Emery | Apr. 10, 1900 |
| 715,631 | Ayres | Dec. 9, 1902 |
| 730,244 | Edwards | June 9, 1903 |
| 1,323,987 | Keller | Dec. 2, 1919 |
| 2,125,005 | Jearom | July 26, 1938 |
| 2,401,490 | Little | June 4, 1946 |